Aug. 4, 1964   G. E. MARTIN   3,143,735
HEIGHT COMPUTER
Filed April 23, 1957   2 Sheets-Sheet 1
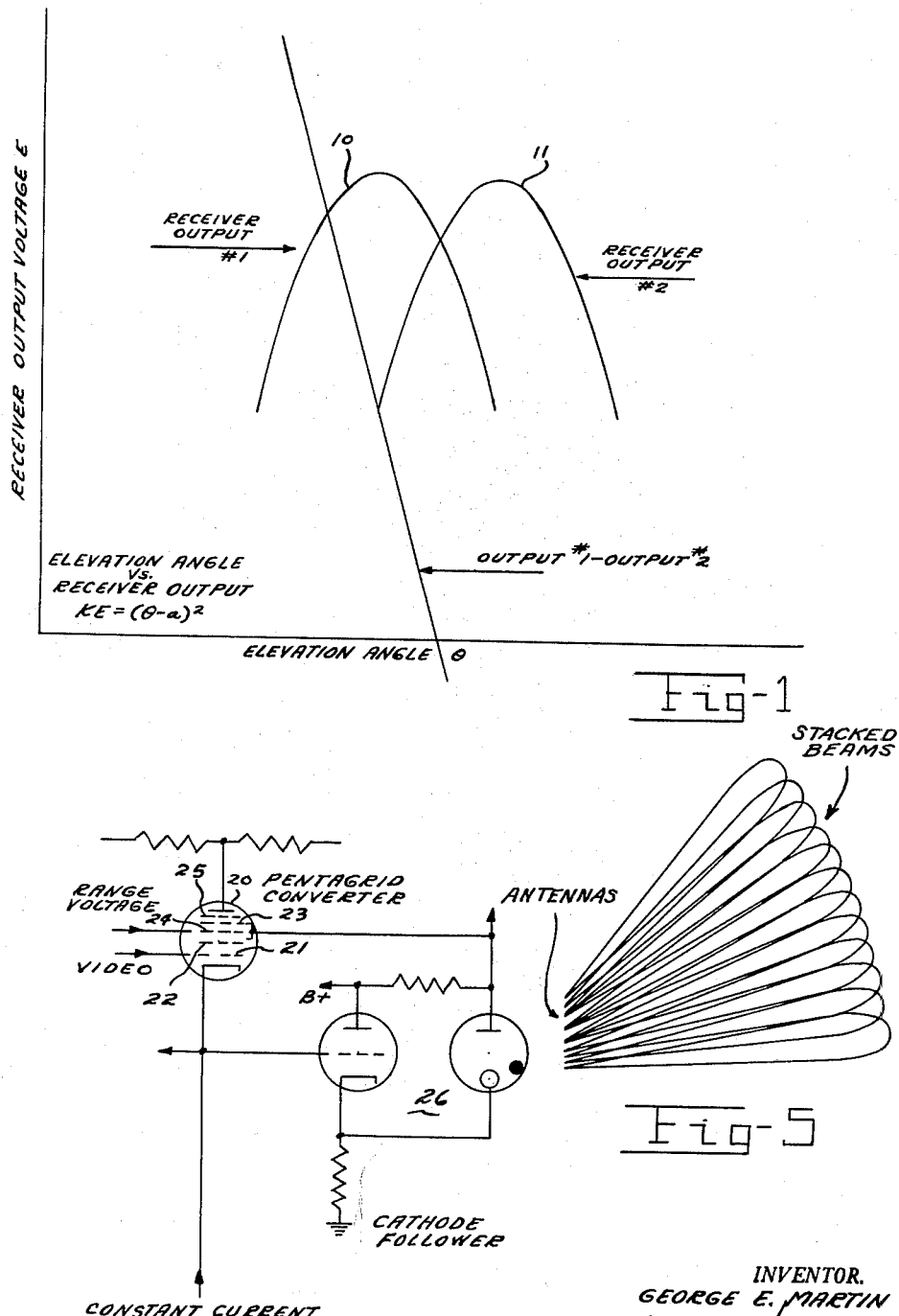

Aug. 4, 1964 G. E. MARTIN 3,143,735
HEIGHT COMPUTER
Filed April 23, 1957 2 Sheets-Sheet 2
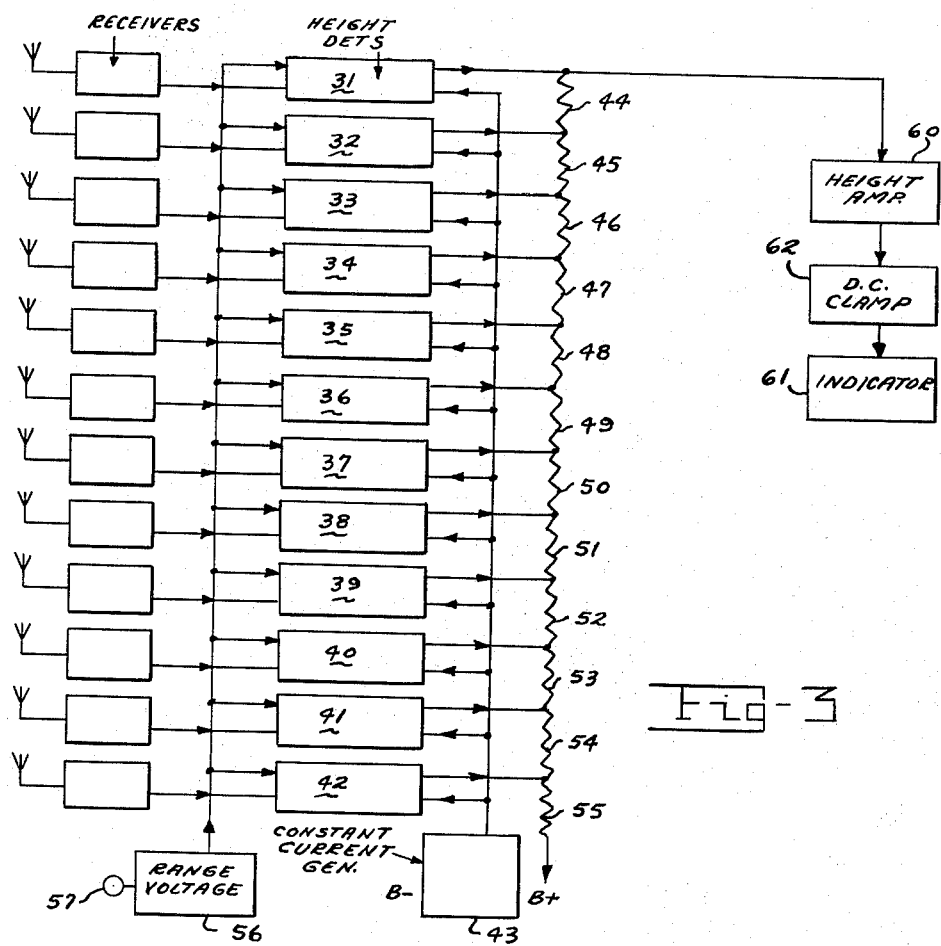
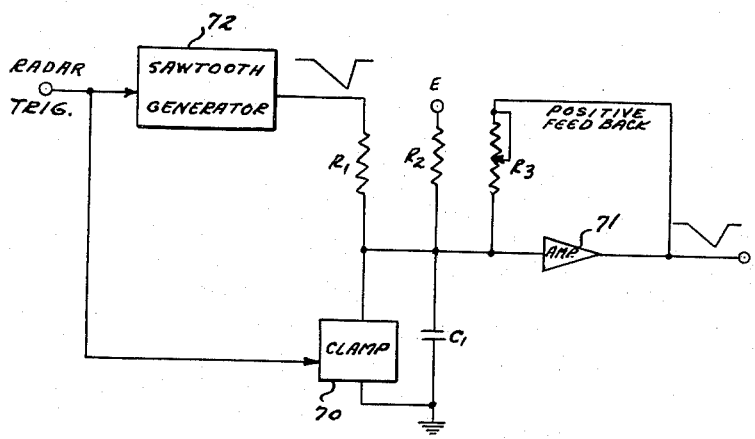
INVENTOR.
GEORGE E. MARTIN
BY
ATTORNEY
AGENT

United States Patent Office 3,143,735
Patented Aug. 4, 1964

3,143,735
HEIGHT COMPUTER
George E. Martin, Crownsville, Md., assignor, by mesne assignments, to the United States of America as represented by the Secretary of the Air Force
Filed Apr. 23, 1957, Ser. No. 654,623
2 Claims. (Cl. 343—10)

This invention relates to a height computer wherein a height indication is obtained by determining in which beam of an antenna, with several vertically stacked beams, the target appears.

There is a complete receiving system for each of the beams. If the outputs from all of the receivers are fed into a linear ratio detector, the output of said detector will be a voltage which varies linearly with the elevation angle. Knowing the elevation angle of the beam and the range of the target, the actual height of the target may be derived. While a height computer for this system exists, it is very complicated and uses many tubes.

The main object of the invention is to reduce the accuracy requirements of the detector load resistor and the following circuitry.

A further object is to provide a height computer that is less complicated and uses less tubes than existing models.

These and other objects are accomplished by providing pentagrid converters in the detector circuits and by applying the video signal to the first grid and the range voltage to the second grid of the pentagrid converters. The pentagrid converters will function as two triodes where both the receiver output voltage and the range voltage control the amount of current flowing in the second triode section.

In the drawing,

FIG. 1 shows a plot of receiver output as a function of elevation angle for the two adjacent beams.

FIG. 2 is a circuit schematic showing the height detector of the invention.

FIG. 3 is a block diagram of the height computer of the invention.

FIG. 4 is a block diagram which illustrates a method of adding an earth's curvature correction to the range sweep voltage.

FIG. 5 shows a radiation pattern for plurality of stacked radar beams.

Referring to FIG. 1 of the drawing, a parabolic curve such as 10 will result if one of the receiver outputs is plotted as a function of elevation angle. If the same function is plotted for a second receiver a curve 11 will be produced. Then if the curve 11 is subtracted from curve 10, a voltage output is obtained that varies linearly with the elevation angle. Similarly if the outputs of all of the receivers are fed into a linear detector, the output voltage will vary linearly with the elevation angle. Such a detector can be had by feeding the receiver outputs to the control grids of a series of triodes. These triodes have their cathodes connected together and to a constant current generator. The plate load resistors are connected in series, leading to a B-plus supply. The output is then taken from the triode plate that is farthest removed from the B-plus supply. Since the output of the detectors is in terms of the elevation angle $\theta$ rather than the sine function of the angle as is required for the determination of altitude, the resistor network values must be modified to provide an approximate sine function output.

To convert the output voltage of the detector to a function of altitude rather than elevation angle, a range factor must be inserted. This invention shows how this range factor can be inserted in the detector itself.

In FIG. 2, reference numeral 20 refers to a pentagrid converter tube. The video signal from a receiver is applied to control grid 21. Grids 22 and 23 are connected together and function as a screen grid. Grid 24 is biased negatively and has the range voltage applied to it and grid 25 is a suppressor grid. Grid 21 controls the space current drawn from the cathode in accordance with the signal voltage and grid 24 serves as a switch which allows the signal current to pass on to the anode or causes them to be returned to the screen region, according to the magnitude of the range voltage. The result is the equivalent of modulating the signal voltage with the range voltage. The characteristic of the video section of the pentagrid converter is held constant by a voltage regulator 26 which is connected between the screen grid and the cathode.

In FIG. 3, reference numerals 31 to 42 refer to a plurality of detectors of the type shown in FIG. 2. The cathodes of all of the detectors are connected to a constant current source 43 so that the current will divide among the detectors depending upon the relative potentials of their control grids. If only one radar beam has a signal only the detector corresponding to that beam will conduct. If two radar beams have signals the two corresponding detectors will conduct and divide the constant current in proportion to the relative amplitudes of the two signals. This action causes the output of the detectors when applied to the sine function resistors 44–55 to produce an output voltage proportional to sin $\theta$. The radar range voltage from range voltage generator 56 is applied to all of the height detectors in the manner shown in FIG. 2. The range voltage when applied to the pentagrid converters will cause the current which is flowing in those tubes that are conducting to divide between the plate and screen circuit depending upon the magnitude of the range voltage and thereby modify the video signal as a function of range by determining the portion of the video current which flows to the plate.

The output of the height detectors is applied to an amplifier 60 and then to a range height indicator 61 with a D.C. clamp 62 connected between the amplifier 60 and height indicator 61.

The computed altitude must be corrected for earth's curvature. This correction can be approximated to a reasonable accuracy by adding a voltage proportional to $KR^2$ to the range voltage where K is a constant and R is the radar range. FIG. 4 illustrates a circuit for adding an earth's curvature correction to the range sweep voltage. The basic sweep voltage is generated when the radar trigger releases the clamp 70 and allows the capacitor $C_1$ to charge toward voltage E through $R_2$. Amplifier 71 with the positive feedback through $R_3$, compensates for the exponential or nonlinear charging of capacitor $C_1$ through $R_2$. At the same time that clamp 70 is released, the sawtooth generator 72 starts to generate a linear voltage vs. time signal that also charges capacitor $C_1$ through $R_1$ thereby producing the desired square law earth's curvature correction. Amplifier 71 with the feedback also acts to maintain a true square law voltage in the same manner that the sweep voltage is maintained linear. The output of amplifier 71 is a composite of range sweep voltage and the earth's curvature correction voltage.

The stacked radar beams of FIG. 5 are the transmitting and receiving patterns for the antenna elements of FIG. 3 and show the pattern for the beam from each antenna being directed at a different angle in elevation, that is, the antennas for the receivers have their main lobes fanned out and directed at different angles in a vertical plane.

There is thus provided a less complicated height computer in which the accuracy requirements of the detector load resistors and the following circuitry is reduced.

While a specific embodiment of the invention has been disclosed, it will be understood that numerous changes may be made without departing from the general principles and scope of the invention.

I claim:
1. A device for determining the height of a target comprising: a plurality of receivers having antennas connected thereto, with the main lobes of said antennas being fanned out and directed at different angles in a vertical plane, a detector connected to each of said receivers, a pentagrid converter tube having a cathode, an anode, a screen grid, a suppressor grid, a first and a second control grid in each of said detectors with the receiver output being connected to the first control grid, means for producing a voltage proportional to radar range, means for producing an earth's curvature correction voltage, means for applying said range voltage and said earth's curvature correction voltage to said second control grid, a constant current source connected to the cathode of all of said converter tubes, means for converting the output of said detectors to a sine function of the elevation angle of said target, an indicator and means for applying said sine function voltage to said indicator.

2. A device for determining the height of a target comprising: a plurality of receivers having antennas connected thereto with the main lobes of said antennas being fanned out and directed at different angles in a vertical plane, a detector connected to each of said receivers, a pentagrid converter tube having a cathode, an anode, a screen grid, a suppressor grid and a first and second control grid in each of said detectors with the receiver output being connected to the first control grid, means for producing a voltage proportional to radar range, means for producing an earth's curvature correction voltage, means for applying said range voltage and said earth's curvature correction voltage to said second control grid, a constant current source connected to the cathode of all of said converter tubes, means for converting the output of said detectors to a sine function of the elevation angle of said target, said last named means being a resistor network with one end connected to a B-plus supply, an indicator, and means for connecting the other end of said resistor network to said indicator to thereby produce a height indication.

References Cited in the file of this patent
UNITED STATES PATENTS

| | | |
|---|---|---|
| 2,444,770 | Fyler | July 6, 1948 |
| 2,624,874 | Rines | Jan. 6, 1953 |
| 2,822,537 | Bartelink | Feb. 4, 1958 |